United States Patent

Kashiki

[11] Patent Number: 6,084,720
[45] Date of Patent: Jul. 4, 2000

[54] SMALL-SIZED REAL IMAGE MODE ZOOM FINDER

[75] Inventor: Yasutaka Kashiki, Hachioji, Japan

[73] Assignee: Olympus Optical Co., Ltd., Tokyo, Japan

[21] Appl. No.: 09/179,320

[22] Filed: Oct. 27, 1998

[30] Foreign Application Priority Data

Oct. 28, 1997 [JP] Japan ..................................... 9-295822

[51] Int. Cl.[7] .......................... G02B 15/14; G02B 23/00; G03B 13/06; G03B 13/10
[52] U.S. Cl. .......................... 359/676; 359/686; 359/422; 359/432; 396/382; 396/379
[58] Field of Search .................................. 359/676–686, 359/362–435; 396/379–382

[56] References Cited

U.S. PATENT DOCUMENTS 5,920,427  7/1999  Ogata ..................................... 359/432

FOREIGN PATENT DOCUMENTS 5-164964  6/1993  Japan .
7-128707  5/1995  Japan .
8-240769  9/1996  Japan .
10-123590  5/1998  Japan .

*Primary Examiner*—Georgia Epps
*Assistant Examiner*—David N. Spector
*Attorney, Agent, or Firm*—Pillsbury, Madison & Sutro LLP

[57] ABSTRACT

A real image mode zoom finder includes, in order from the object side, an objective optical system with positive refracting power having a first lens unit with negative refracting power, a second lens unit with positive refracting power, a third lens unit with positive refracting power, and a fourth lens unit with negative refracting power; an image erecting system for erecting an intermediate image formed by the objective optical system; and an ocular optical system with positive refracting power. In this case, each of lens units constituting the objective optical system is constructed with a single lens, and the object-side surface of the first lens unit is configured to be concave. Moreover, the objective optical system satisfies the following condition:

$$2.5 < \alpha_{T(R2)} < 5.7$$

where $\alpha_{T(R2)}$ is a combined longitudinal magnification ranging from the second lens unit of the objective optical system to the intermediate image at the telephoto position of the finder.

4 Claims, 5 Drawing Sheets

SPHERICAL ABERRATION
PUPIL DIA. : 4mm

−2.00    [m⁻¹]    2.00

ASTIGMATISM
ω : 25.9°

−2.00    [m⁻¹]    2.00

DISTORTION
ω : 25.9°

−10.00    [%]    10.00

SPHERICAL ABERRATION
PUPIL DIA. : 4mm

−2.00    [m⁻¹]    2.00

ASTIGMATISM
ω : 17.3°

−2.00    [m⁻¹]    2.00

DISTORTION
ω : 17.3°

−10.00    [%]    10.00

SPHERICAL ABERRATION
PUPIL DIA. : 4mm

−2.00    [m⁻¹]    2.00

ASTIGMATISM
ω : 10.4°

−2.00    [m⁻¹]    2.00

DISTORTION
ω : 10.4°

−10.00    [%]    10.00

SMALL-SIZED REAL IMAGE MODE ZOOM FINDER

BACKGROUND OF THE INVENTION

1. Field of the Invention

This Invention relates to a real image mode zoom finder suitable for a lens shutter camera or a still camera in which a finder lens system is constructed to be independent of a photographic lens system.

2. Description of Related Art

In general, finder optical systems used in lens shutter cameras and constructed to be independent of photographing optical systems are roughly divided into two classes: virtual image mode finders and real image mode finders.

The virtual image mode finder has the disadvantage that the diameter of a front lens must be enlarged as the variable magnification ratio of the finder increases, which constitutes an obstacle to compactness of the finder. Furthermore, this type of finder optical system has the problem that the view of a field frame is unclear.

The real image mode finder, in contrast with this, is such that the diameter of the front lens can be diminished because its entrance pupil can be located on the front side of the finder. Since an image formed by an objective system can be observed through an ocular system, the defects of the virtual image mode finder mentioned above are practically obviated, and thus a finder with a good view of the field frame can be obtained. Moreover, in the real image mode finder, it is possible to realize a smaller-sized finder by modifying the configurations of prisms constituting an image erecting system. It is for these reasons that such real image mode finders are used at present in many of lens shutter cameras having variable magnification functions.

In recent years, further compactness of the camera and an improvement on the variable magnification ratio of the finder have been required. For the real image mode finder, a two- or three-lens unit type zoom system has been proposed as a finder with a variable magnification ratio of about 2. In order to further increase the variable magnification ratio, it is necessary to improve the variable magnification functions of individual lens units constituting the finder. Consequently, the refracting powers of the individual lens units of the finder are strengthened and the fluctuation of aberration caused when the magnification of the finder is changed becomes heavy. Furthermore, in order to change the magnification, it is necessary to hold sufficient space for movement of the individual lens units. This increases the overall length of the finder and the thickness of the camera.

If the overall length of the finder is reduced with little change of the variable magnification ratio, the refracting powers of the individual lens units must be made stronger because the space required for lens movement where the magnification is changed becomes narrow, and considerable aberration will be produced by the lens units for changing the magnification.

In this way, when the variable magnification ratio of the real image mode finder constructed with two or three lens units is increased, considerable aberration is particularly produced by the lens units for changing the magnification, and hence the fluctuation of aberration caused when the magnification is changed becomes prominent. In the two- or three-lens unit type zoom system, the number of lens units is so small that correction for aberration will be difficult if at least one lens unit which yields a considerable amount of aberration is included in the finder.

These problems, however, are solved when the zoom system of the finder is constructed with four lens units. According to the zoom system of the four lens units, functions relative to variable magnification and correction for aberration can be successfully imparted to the individual lens units. When the first lens unit closest to an object, of the four lens units, has a negative refracting power, the back focal distance of the objective system can be increased. In particular, this arrangement is very advantageous for compactness of the finder when a part of image inverting members is placed in the objective system. Furthermore, when the fourth lens unit has a negative refracting power, this arrangement is particularly advantageous for the case where the overall length of the objective system is reduced on the side of the secondary focal length.

For the zoom system of the finder constructed with the four lens units, a finder with a variable magnification ratio of at least 2, having an objective system which includes, in order from the object side, lenses with negative, positive, positive, and negative powers, is disclosed, for example, in each of Japanese Patent Preliminary Publication Nos. Hei 5-164964, Hei 7-128707, and Hei 8-240769.

In Hei 5-164964, a finder shown in the first embodiment is favorably corrected for aberration in such a way that the second lens unit of the objective system which has a leading, variable magnification function is constructed with a plurality of lenses. However, lenses constituting the finder are large in number, which causes oversizing of the finder. A finder described in the second embodiment of this publication is designed so that each of lens units is constructed with a single lens to thereby realize a small-sized finder. However, since in the third lens unit an aspherical surface with high refracting power is not placed on the image side thereof, but on the object side, there is room for improvement as to correction for aberration. In this finder, a combined longitudinal magnification of an optical system subsequent to the second lens unit of the objective system increases at the telephoto position of the finder. Thus, since the influence of the assembly error of the finder on a diopter becomes remarkable, there is the need to accurately assemble the finder, which causes an increase in production cost.

In Hei 7-128707, a real image mode finder is disclosed in which each of the lens units of the objective system is constructed with a single lens and which has a wide angle of field and is small in size. However, since in this finder the entrance surface of the first lens unit is configured as a convex surface, the entrance pupil is located inside the finder, and the lens diameter of the first lens unit enlarges.

A finder disclosed in Hei 8-240769 is designed to realize a finder which has a variable magnification ratio as high as at least 3 and is small in size. However, the combined longitudinal magnification of an optical system subsequent to the second lens unit of the objective system increases at the telephoto position, and thus the Influence of the assembly error of the finder on the diopter becomes pronounced. Hence, an accurate assembly is required for the finder, resulting in a rise of production cost.

SUMMARY OF THE INVENTION

It is, therefore, an object of the present invention to provide a small-sized real image mode zoom finder which is simple in optical arrangement, has a function of favorable correction for aberration, and is low in cost, though the finder has a variable magnification ratio as high as 2 or more.

In order to achieve this object, the small-sized real image mode zoom finder according to the present invention comprises, in order from the object side, an objective optical system with positive refracting power including a first lens unit with negative refracting power, a second lens unit with positive refracting power, a third lens unit with positive refracting power, and a fourth lens unit with negative refracting power; an image erecting system for erecting an intermediate image formed by the objective optical system; and an ocular optical system with positive refracting power. In this case, each of the lens units constituting the objective optical system is constructed with a single lens, and the object-side surface of the first lens unit is configured to be concave. Moreover, the objective optical system satisfies the following condition:

$$2.5 < \alpha_{T(R2)} < 5.7 \tag{1}$$

where $\alpha_{T(R2)}$ is a combined longitudinal magnification, at a telephoto position of said finder, of an optical section that includes the second lens unit of the objective optical system and all optical elements disposed between said second lens unit and the intermediate image.

Further, the real image mode zoom finder of the present invention comprises, in order from the object side, an objective optical system with positive refracting power including a first lens unit with negative refracting power, a second lens unit with positive refracting power, a third lens unit with positive refracting power, and a fourth lens unit with negative refracting power; an image erecting system for erecting an intermediate image formed by the objective optical system; and an ocular optical system with positive refracting power. In this case, the fourth lens unit is constructed integrally with a part of the image erecting system, and the image-side surface of the third lens unit is configured to be aspherical.

Still further, the real image mode zoom finder according to the present invention satisfies the following condition:

$$4.7 < D_{13W}/\gamma < 6.2 \tag{2}$$

where $D_{13W}$ is a distance from the object-side surface of the first lens unit to the image-side surface of the third lens unit at the wide-angle position of the finder and $\gamma$ is the variable magnification ratio of the finder.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
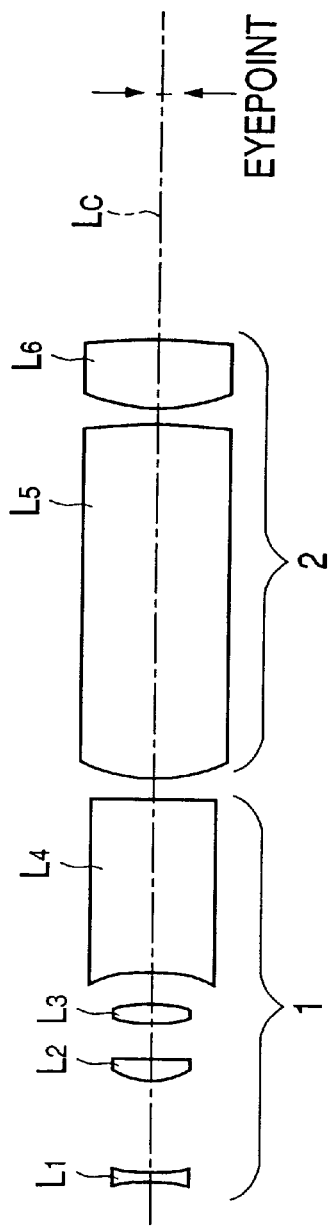
FIGS. 1A, 1B, and 1C are sectional views showing arrangements, developed along the optical axis, at wide-angle, middle, and telephoto positions, respectively, of the real image mode zoom finder of a first embodiment in the present invention.

In order to achieve compactness of the real image mode finder while maintaining a high variable magnification ratio, it is desirable that the objective optical system performing the variable magnification function is constructed with a zoom system composed of four lens units. Furthermore, when the first lens unit closest to the object is provided with negative refracting power, the back focal length of the objective optical system can be increased. This is very advantageous for compactness of the finder in the case where a part of an image erecting member is contained in the objective optical system. In addition, since the effect that the entrance pupil is located on the front side of the finder is brought about, the diameters of lenses constituting the finder, notably the diameter of a front lens, can be diminished.

Thus, the real image mode zoom finder of the present invention comprises, in order from the object side, the objective optical system with positive refracting power, including four lens units; the image erecting system for erecting the intermediate image formed by the objective optical system; and the ocular system with positive refracting power. In particular, the first lens unit of the objective optical system Is provided with a negative refracting power.

For the real image mode zoom finder, in order to make a high variable magnification ratio compatible with a compact design, each lens unit having the variable magnification function must be provided with a high refracting power, and thus aberration produced by such a lens unit become prominent. In this way, the real image mode zoom finder of the present invention is designed so that each of the second and third lens units of the objective optical system which chiefly performs the variable magnification function has a positive refracting power. Hence, by sharing this function between the lens units, the enhancement of the refracting power is prevented and the production of aberration is suppressed.

When the objective optical system is constructed as mentioned above, however, the first lens unit with negative refracting power, the second lens unit with positive refracting power, and the third lens unit with positive refracting power will be integrated as one block at the telephoto position. Consequently, at the telephoto position, the overall length of the objective optical system is equalized to the focal length thereof. Thus, in the real image mode zoom finder of the present invention, a negative refracting power is imparted to the fourth lens unit to thereby reduce the overall length of the objective optical system.

Furthermore, in the real image mode zoom finder of the present invention, each of the first to fourth lens units of the objective optical system is constructed with a single lens, and thereby the thickness of each lens unit is decreased to reduce the overall length of the objective optical system. Such a single-lens design simplifies the arrangement of the objective optical system and provides a finder which is easy in assembly and low in production cost. In addition, the object-side surface of the first lens unit of the objective optical system is configured to be concave, and thereby the position of the entrance pupil can be shifted to the front side of the finder. In this way, the lens diameter of each lens unit of the objective optical system can be diminished. Even where the mirror frame of a photographing optical system protrudes from the entrance window of the finder toward the object because of the layout of a camera, the disadvantage that the mirror frame of the photographing optical system would also be seen in the field frame of the finder can be obviated.

In view of the above description, it is desirable that the real image mode zoom finder of the present invention satisfies Condition Condition (1) refers to the influence of location tolerance of the distance between the first and second lens units of the objective optical system at the telephoto position on the diopter. In the real image mode zoom finder of the present invention, a shift in diopter due to the assembly error of the finder increases in particular at the telephoto position when an attempt is made to attain a high variable magnification ratio. Hence, a case may occur in which the variable magnification ratio must be restricted because it is difficult to maintain good accuracy of assembly. In order to obviate such a defect, it is also necessary to satisfy Condition (1).

Also, if the value of $\alpha_{T(R2)}$ of Condition (1) exceeds the upper limit thereof, the influence on the diopter will be enhanced and the assembly of the finder becomes difficult, with a resulting rise in production cost. On the other hand, if the value of $\alpha_{T(R2)}$ is below the lower limit, the variable magnification ratio of the finder will cease to be maintainable.

In order to reduce the number of parts and cut the cost of the finder in the present invention, it is favorable that the fourth lens unit of the objective optical system is constructed integrally with a part of the image erecting system. Of the lens units chiefly performing the variable magnification function, the third lens unit is farthest from the entrance pupil in particular so that a marginal beam considerably separates from a central beam on the image side. An aspherical surface is thus used for the image-side surface of the third lens unit, thereby bringing about the effect of correction for aberration, notably correction for astigmatism.

Furthermore, it is desirable that the real image mode zoom finder of the present invention satisfies Condition (2).

In the real image mode zoom finder of the present invention, where the fourth lens unit of the objective optical system is constructed integrally with a part of the image erecting system, the image erecting system can be downsized by folding the optical path. In contrast to this, the variable magnification section of the objective optical system needs sufficient space for movement of the lens units, and thus downsizing of the objective optical system is difficult. In this way, the value of $D_{13W}$ of Condition (2) has a significant effect on the determination of the overall length of the finder. If an attempt is made to increase the variable magnification ratio of the finder within a limited space, the refracting power of each lens unit for changing the magnification must be enhanced as mentioned above, and as a result, the amount of production of aberration increases. That is, Condition (2) gives a condition for making a compact design compatible with a high variable magnification ratio in the finder.

If the value of $D_{13W}/\gamma$ of Condition (2) oversteps the upper limit thereof, correction for aberration becomes easy, but it is difficult to reduce the overall length of the objective optical system or increase the variable magnification ratio. Below the lower limit, the space for movement of the lens units for changing the magnification is narrowed, and hence the refracting power of each lens unit must be enhanced. Moreover, in addition to the fact that the change of the magnification is carried out with such a narrowed space, the number of lenses constituting the finder must be reduced. This increases the amount of production of aberration in each lens unit of the objective optical system. By diminishing the distance between the aspherical surface located at the image-side surface of the third lens unit and the entrance pupil, the marginal beam ceases to considerably separate from the central beam, and correction for aberration, notably correction for astigmatism at the wide-angle position, due to the aspherical surface, becomes difficult.

Additionally, in the real image mode zoom finder of the present invention, when the magnification is changed, the first lens unit of the objective optical system is fixed, and thereby the arrangement can be further simplified, with the result that production cost is reduced.

In accordance with the embodiments shown in the drawings, the present invention will be described in detail below.

First Embodiment

Figure 1B:
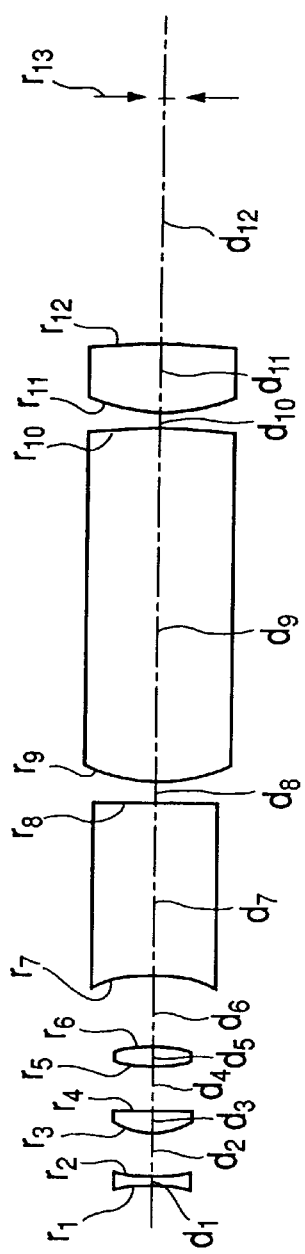
Figure 1C:
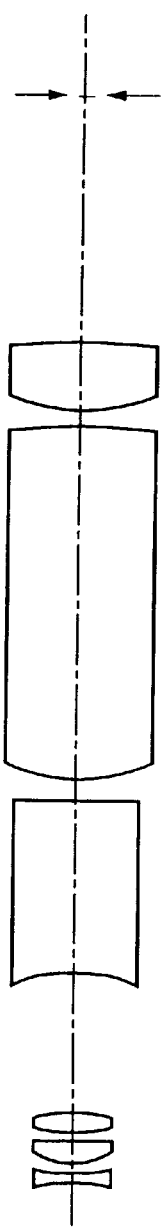
Figure 2A:
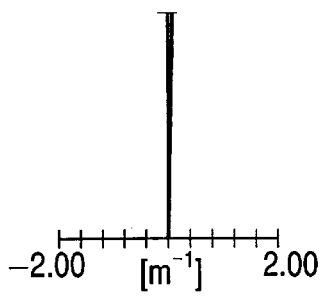
FIGS. 2A, 2B, and 2C are diagrams showing aberration characteristics at the wide-angle position of the real image mode zoom finder of the first embodiment.
Figure 2B:
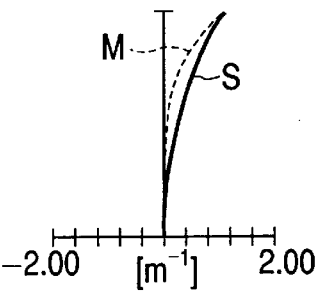
Figure 2C:
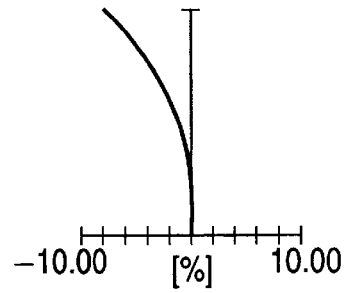
Figure 3A:
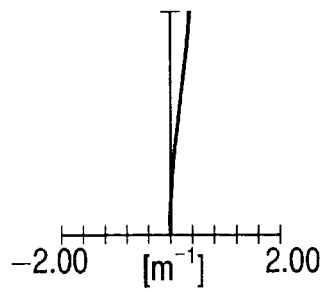
FIGS. 3A, 3B, and 3C are diagrams showing aberration characteristics at the middle position of the real image mode zoom finder of the first embodiment.
Figure 3B:
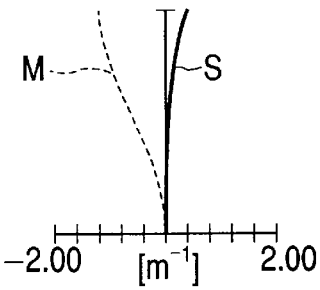
Figure 3C:
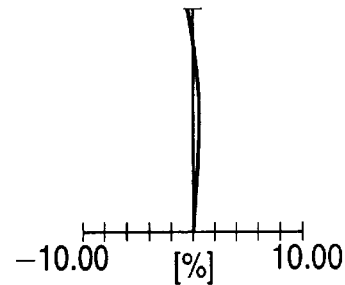
Figure 4A:
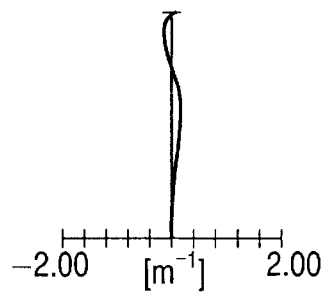
FIGS. 4A, 4B, and 4C are diagrams showing aberration characteristics at the telephoto position of the real image mode zoom finder of the first embodiment.
Figure 4B:
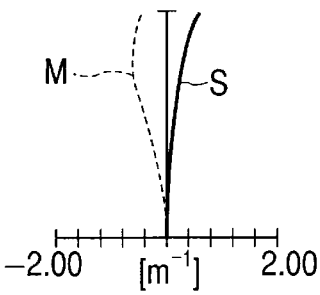
Figure 4C:
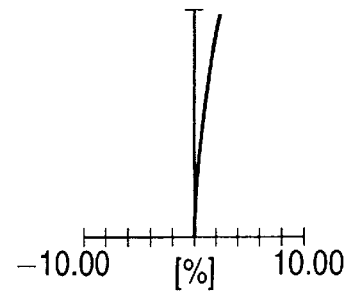

The real Image mode zoom finder of this embodiment, as shown in FIGS. 1A, 1B, and 1C, comprises an objective optical system 1 and an ocular optical system 2 which are arranged in this order from the object side. The objective optical system 1 includes, in order from the object side, a first lens unit $L_1$ with negative refracting power, a second lens unit $L_2$ with positive refracting power, a third lens unit $L_3$ with positive refracting power, and a fourth lens unit $L_4$ with negative refracting power, also retaining a function as a reflecting member. The ocular optical system includes, in order from the object side, a prism $L_5$ which is a reflecting member and an eyepiece $L_6$. The fourth lens unit $L_4$ and the prism $L_5$ constitute an image erecting member.

The real image mode zoom finder of the first embodiment is such that, of individual lens units constituting the objective optical system 1, the first lens unit $L_1$ and the fourth lens unit $L_4$ are fixed, and the second lens unit $L_2$ and the third lens unit $L_3$ are moved along an optical axis $L_C$, thereby carrying out the change of the magnification. The object-side surface of the first lens unit $L_1$ is configured to be concave. The fourth lens unit $L_4$ and the prism $L_5$ have reflecting surfaces (not shown), two for each. Any of the first, second, third, and fourth lens units $L_1$, $L_2$, $L_3$, and $L_4$ is constructed with a single lens. Also, the exit surfaces of the first and third lens units $L_1$ and $L_3$ and the entrance surfaces of the second and fourth lens units $L_2$ and $L_4$ are configured to be aspherical.

The following are numerical data relative to the real image mode zoom finder of the first embodiment.

```
Finder magnification           0.432x–1.014x
Angle of view (2ω)             51.9°–20.8°
Pupil diameter                 4 mm
α_T(R2) = 4.60
D_13w/γ = 5.52
r_1 = –13.958
     d_1 = 0.70      nd_1 = 1.58423      v_1 = 30.49
r_2 = 9.072 (aspherical)
     d_2 = 6.80 (wide-angle), 3.59 (middle), 0.85 (telephoto)
r_3 = 6.291 (aspherical)
     d_3 = 1.53      nd_3 = 1.49241      v_3 = 57.66
```

-continued $r_4 = -61.633$
    $d_4 = 2.59$ (wide-angle), 3.25 (middle), 0.73 (telephoto)
$r_5 = 16.055$
    $d_5 = 1.33$      $nd_5 = 1.49241$      $\nu_5 = 57.66$
$r_6 = -14.618$ (aspherical)
    $d_6 = 2.46$ (wide-angle), 5.00 (middle), 10.25 (telephoto)
$r_7 = -24.541$ (aspherical)
    $d_7 = 13.00$      $nd_7 = 1.52542$      $\nu_7 = 55.78$
$r_8 = \infty$
    $d_8 = 1.50$
$r_9 = 12.504$
    $d_9 = 26.50$      $nd_9 = 1.52542$      $\nu_9 = 55.78$
$r_{10} = -124.987$
    $d_{10} = 1.50$
$r_{11} = 14.176$ (aspherical)
    $d_{11} = 4.75$      $nd_{11} = 1.52542$      $\nu_{11} = 55.78$
$r_{12} = -47.882$
    $d_{12} = 18.50$
$r_{13} = \infty$ (eyepoint)

Conic constants and aspherical coefficients

Second surface $K = -17.4679$
$A_4 = 2.3937 \times 10^{-3}, A_6 = -2.4953 \times 10^{-4},$
$A_8 = 3.4063 \times 10^{-5}, A_{10} = -3.1907 \times 10^{-6}$ Third surface $K = 1.3715$
$A_4 = -1.3301 \times 10^{-3}, A_6 = -2.2595 \times 10^{-5},$
$A_8 = -1.4247 \times 10^{-6}, A_{10} = -2.2948 \times 10^{-7}$ Sixth surface $K = -5.9176$
$A_4 = 3.8448 \times 10^{-4}, A_6 = 6.2037 \times 10^{-6},$
$A_8 = 1.3894 \times 10^{-6}, A_{10} = -1.6737 \times 10^{-7}$ Seventh surface $K = 21.8505$
$A_4 = -6.9410 \times 10^{-4}, A_6 = = 1.1885 \times 10^{-4},$
$A_8 = -8.0697 \times 10^{-6}$ Eleventh surface $K = 1.0224$
$A_4 = -9.1751 \times 10^{-5}, A_6 = -3.0775 \times 10^{-6},$
$A_8 = 8.4886 \times 10^{-8}, A_{10} = -1.1576 \times 10^{-9}$ FIGS. 2A–2C, 3A–3C, and 4A–4C show aberration curves in the real image mode zoom fonder of the first embodiment.

Second Embodiment

Figure 5A:
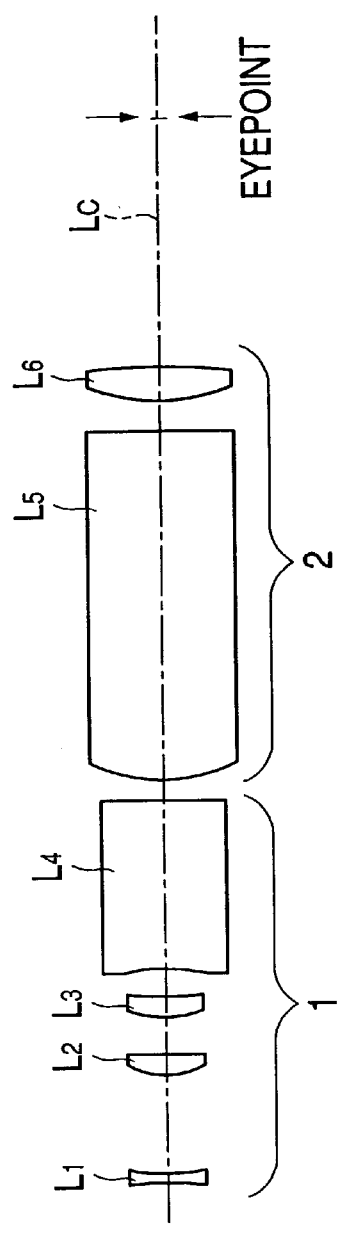
FIGS. 5A, 5B, and 5C are sectional views showing arrangements, developed along the optical axis, at wide-angle, middle, and telephoto positions, respectively, of the real image mode zoom finder of a second embodiment in the present invention.
Figure 5B:
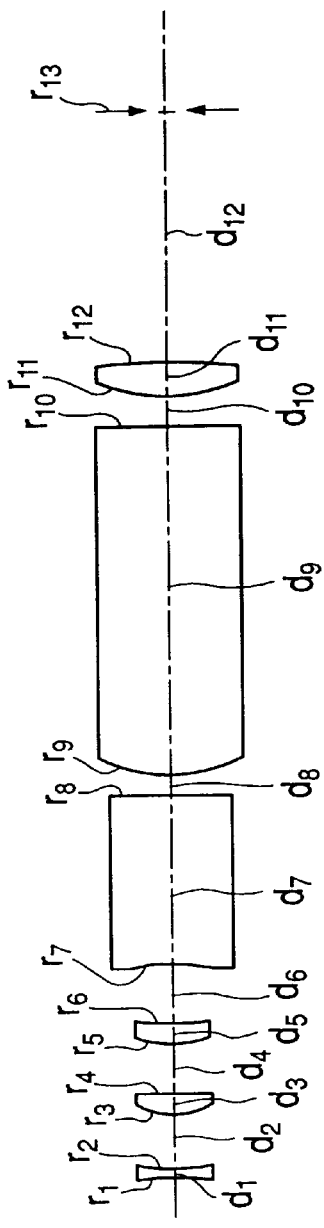
Figure 5C:
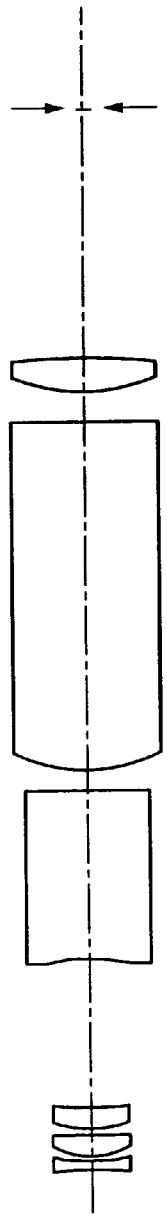

The real image mode zoom finder of this embodiment, as shown in FIGS. 5A, 5B, and 5C, has the same arrangement as in the first embodiment with the exception that the entrance surface of the third lens unit $L_3$ of the objective optical system 1 is also configured to be aspherical. Hence, a detailed description of the second embodiment is omitted.

The following are numerical data relative to the real image mode zoom finder of the second embodiment.

Finder magnification      0.431×–1.145×
Angle of view (2ω)      52.0°–18.5°
Pupil diameter      4 mm
$\alpha_{T(R2)} = 5.14$
$D_{13w}/\gamma = 5.14$
$r_1 = -21.349$
    $d_1 = 0.70$      $nd_1 = 1.58423$      $\nu_1 = 30.49$
$r_2 = 8.095$ (aspherical)
    $d_2 = 7.47$ (wide-angle), 4.07 (middle), 0.45 (telephoto)
$r_3 = 6.906$ (aspherical)
    $d_3 = 1.53$      $nd_3 = 1.49241$      $\nu_3 = 57.66$
$r_4 = -26.237$ -continued $d_4 = 2.60$ (wide-angle), 3.73 (middle), 0.45 (telephoto)
$r_5 = 8.858$ (aspherical)
    $d_5 = 1.33$      $nd_5 = 1.49241$      $\nu_5 = 57.66$
$r_6 = 310.759$ (aspherical)
    $d_6 = 1.97$ (wide-angle), 4.24 (middle), 11.14 (telephoto)
$r_7 = -24.869$ (aspherical)
    $d_7 = 13.00$      $nd_7 = 1.52542$      $\nu_7 = 55.78$
$r_8 = \infty$
    $d_8 = 1.50$
$r_9 = 11.539$
    $d_9 = 26.90$      $nd_9 = 1.52542$      $\nu_9 = 55.78$
$r_{10} = \infty$
    $d_{10} = 1.50$
$r_{11} = 12.836$ (aspherical)
    $d_{11} = 2.45$      $nd_{11} = 1.52542$      $\nu_{11} = 55.78$
$r_{12} = -51.611$
    $d_{12} = 18.50$
$r_{13} = \infty$ (eyepoint)

Conic constants and aspherical coefficients

Figure 6A:
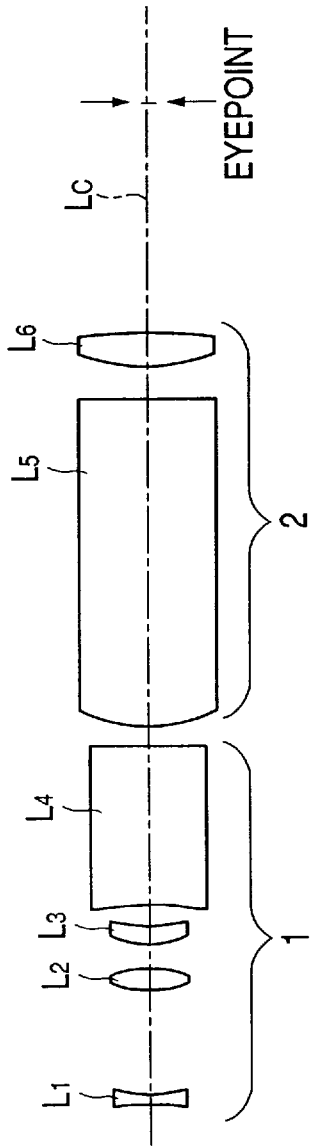
FIGS. 6A, 6B, and 6C are sectional views showing arrangements, developed along the optical axis, at wide-angle, middle, and telephoto positions, respectively, of the real image mode zoom finder of a third embodiment in the present invention.
Figure 6B:
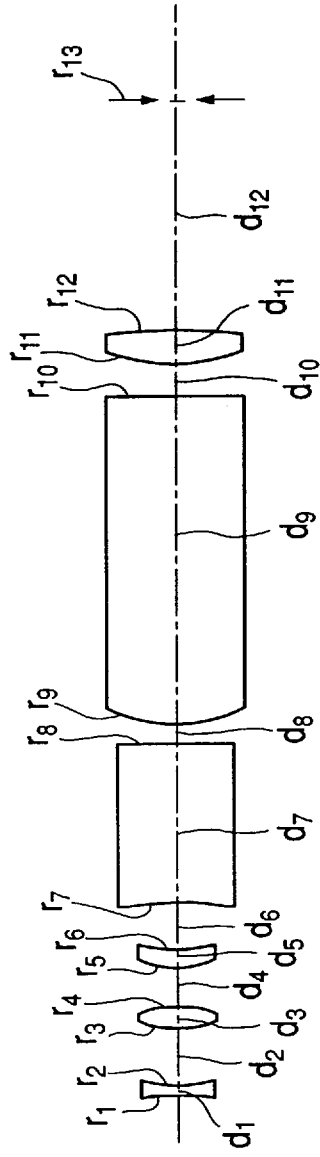
Figure 6C:
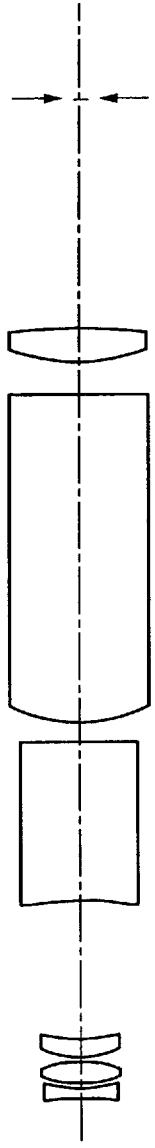

Second surface $K = -12.9994$
$A_4 = 2.5881 \times 10^{-3}, A_6 = -2.9222 \times 10^{-4},$
$A_8 = 3.1774 \times 10^{-5}, A_{10} = -2.0197 \times 10^{6}$ Third surface $K = -1.7007$
$A_4 = 4.0044 \times 10^{-4}, A_6 = 3.4302 \times 10^{-6},$
$A_8 = -1.7264 \times 10^{-7}, A_{10} = -7.2403 \times 10^{7}$ Fifth surface $K = -5.6505$
$A_4 = 6.4996 \times 10^{-4}, A_6 = -2.4386 \times 10^{-6},$
$A_8 = 1.6154 \times 10^{-6}, A_{10} = 1.8594 \times 10^{-6}$ Sixth surface $K = -8.6130$
$A_4 = 4.7895 \times 10^{-4}, A_6 = 5.9261 \times 10^{-6},$
$A_8 = 7.8671 \times 10^{-7}, A_{10} = 2.3078 \times 10^{-6}$ Seventh surface $K = 21.4820$
$A_4 = -1.3453 \times 10^{-4}, A_6 = -4.3803 \times 10^{-5},$
$A_8 = 4.8903 \times 10^{-6}$ Eleventh surface $K = 1.1927$
$A_4 = -1.8483 \times 10^{-4}, A_6 = 5.8107 \times 10^{-8},$
$A_8 = -4.6551 \times 10^{-8}, A_{10} = 2.8071 \times 10^{-11}$ Third Embodiment The real image mode zoom finder of this embodiment, as shown in FIGS. 6A, 6B, and 6C, has the same arrangement as in the first embodiment with the exception that, of individual lens units constituting the objective optical system 1, the fourth lens unit $L_4$ is fixed, the first, second, and third lens units $L_1$, $L_2$, and $L_3$ are moved along the optical axis $L_C$, and the fifth surface is aspherical. Hence, a detailed description of the third embodiment is omitted.

The following are numerical data relative to the real image mode zoom finder of the third embodiment.

Finder magnification      0.433×–1.225×
Angle of view (2ω)      51.9°–17.2°
Pupil diameter      4 mm
$\alpha_{T(R2)} = 5.52$
$D_{13w}/\gamma = 4.86$
$r_1 = -35.626$
    $d_1 = 0.70$      $nd_1 = 1.58423$      $\nu_1 = 30.49$
$r_2 = 7.291$ (aspherical)
    $d_2 = 8.19$ (wide-angle), 4.45 (middle), 0.45 (telephoto)
$r_3 = 7.667$ (aspherical)

Figure 7A:
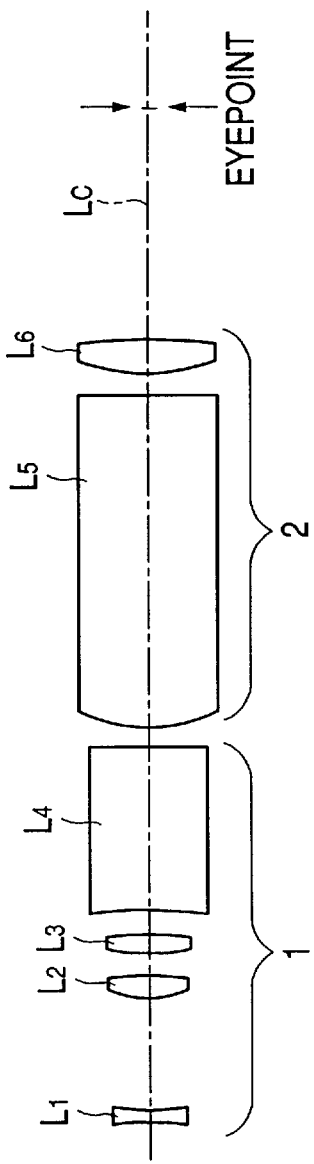
FIGS. 7A, 7B, and 7C are sectional views showing arrangements, developed along the optical axis, at wide-angle, middle, and telephoto positions, respectively, of the real image mode zoom finder of a fourth embodiment in the present invention.
Figure 7B:
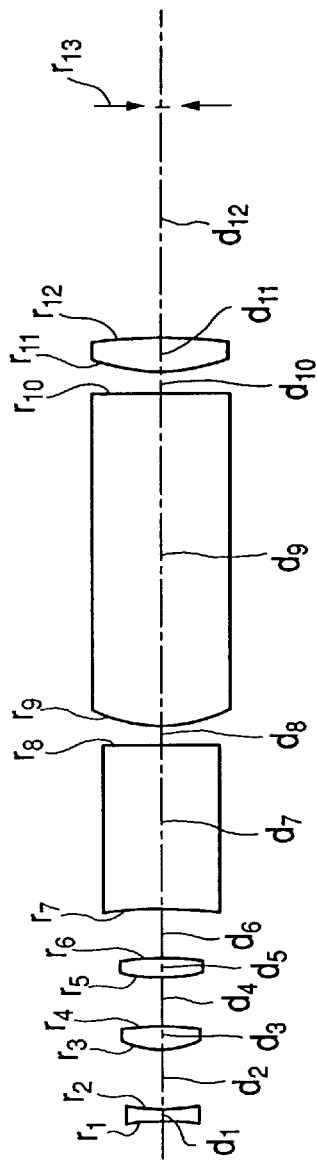
Figure 7C:
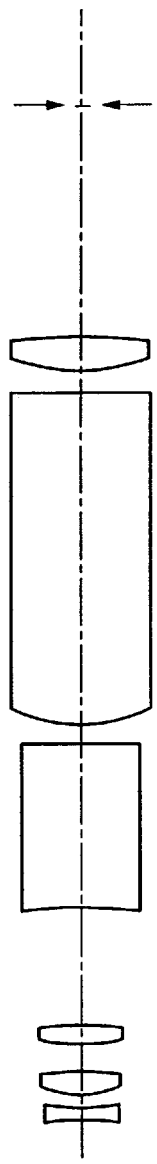

-continued $r_3 = 1.53$  $nd_3 = 1.49241$  $v_3 = 57.66$
$r_4 = -19.589$
  $d_4 = 2.00$ (wide-angle), 3.23 (middle), 0.45 (telephoto)
$r_5 = 6.529$ (aspherical)
  $d_5 = 1.33$  $nd_5 = 1.49241$  $v_5 = 57.66$
$r_6 = 18.700$ (aspherical)
  $d_6 = 2.15$ (wide-angle), 4.32 (middle), 11.54 (telephoto)
$r_7 = -19.864$ (aspherical)
  $d_7 = 13.00$  $nd_7 = 1.52542$  $v_7 = 55.78$
$r_8 = \infty$
  $d_8 = 1.50$
$r_9 = 11.539$
  $d_9 = 26.90$  $nd_9 = 1.52542$  $v_9 = 55.78$
$r_{10} = \infty$
  $d_{10} = 1.50$
$r_{11} = 12.836$ (aspherical)
  $d_{11} = 2.45$  $nd_{11} = 1.52542$  $v_{11} = 55.78$
$r_{12} = -51.611$
  $d_{12} = 18.50$
$r_{13} = \infty$ (eyepoint)
Conic constants and aspherical coefficients Second surface $K = -9.9740$
$A_4 = 2.6068 \times 10^{-3}, A_6 = -2.3924 \times 10^{-4},$
$A_8 = 2.6501 \times 10^{-5}, A_{10} = -2.0853 \times 10^{-6}$
Third surface $K = -1.7356$
$A_4 = 3.2639 \times 10^{-4}, A_6 = 2.2984 \times 10^{-5},$
$A_8 = 6.8580 \times 10^{-7}, A_{10} = -1.3606 \times 10^{-6}$
Fifth surface $K = -6.9045$
$A_4 = 2.7640 \times 10^{-3}, A_6 = -1.7735 \times 10^{-4},$
$A_8 = 1.6551 \times 10^{-5}, A_{10} = 1.9078 \times 10^{-6}$
Sixth surface $K = -2.9646$
$A_4 = 5.1040 \times 10^{-4}, A_6 = 7.2434 \times 10^{-6},$
$A_8 = -7.5901 \times 10^{-7}, A_{10} = 3.8889 \times 10^{-6}$
Seventh surface $K = 18.7601$
$A_4 = 3.6273 \times 10^{-4}, A_6 = -1.7302 \times 10^{-4},$
$A_8 = 1.2017 \times 10^{-5}$
Eleventh surface $K = 1.1927$
$A_4 = -1.8483 \times 10^{-4}, A_6 = 5.8107 \times 10^{-8},$
$A_8 = -4.6551 \times 10^{-8}, A_{10} = 2.8071 \times 10^{-11}$ Fourth Embodiment The real image mode zoom finder of this embodiment, as shown in FIGS. 7A, 7B, and 7C, has the same arrangement as that of the first embodiment, and thus its detailed explanation is omitted.

The following are numerical data relative to the real image mode zoom finder of the fourth embodiment.

| | |
|---|---|
| Finder magnification | 0.432×–1.009× |
| Angle of view (2ω) | 51.1°–20.6° |
| Pupil diameter | 4 mm |

$\alpha_{T(R2)} = 2.69$
$D_{13w}/\gamma = 6.07$
$r_1 = -19.916$
  $d_1 = 0.80$  $nd_1 = 1.58423$  $v_1 = 30.49$
$r_2 = 11.127$ (aspherical)
  $d_2 = 8.54$ (wide-angle), 4.63 (middle), 0.80 (telephoto)
$r_3 = 7.395$ (aspherical)
  $d_3 = 1.70$  $nd_3 = 1.52542$  $v_3 = 55.78$
$r_4 = -30.988$
  $d_4 = 1.82$ (wide-angle), 3.97 (middle), 2.27 (telephoto)

-continued $r_5 = 21.281$
  $d_5 = 1.30$  $nd_5 = 1.49241$  $v_5 = 57.66$
$r_6 = -26.915$ (aspherical)
  $d_6 = 2.04$ (wide-angle), 3.80 (middle), 9.33 (telephoto)
$r_7 = -52.368$ (aspherical)
  $d_7 = 13.00$  $nd_7 = 1.52542$  $v_7 = 55.78$
$r_8 = \infty$
  $d_8 = 1.50$
$r_9 = 12.504$
  $d_9 = 26.69$  $nd_9 = 1.52542$  $v_9 = 55.78$
$r_{10} = \infty$
  $d_{10} = 1.50$
$r_{11} = 14.795$ (aspherical)
  $d_{11} = 2.45$  $nd_{11} = 1.52542$  $v_{11} = 55.78$
$r_{12} = -32.070$
  $d_{12} = 18.50$
$r_{13} = \infty$ (eyepoint)
Conic constants and aspherical coefficients Second surface $K = -10.0850$
$A_4 = 3.3985 \times 10^{-4}, A_6 = 1.0964 \times 10^{-5},$
$A_8 = 2.9651 \times 10^{-6}, A_{10} = -4.0317 \times 10^{-7}$
Third surface $K = 2.0347$
$A_4 = -1.2911 \times 10^{-3}, A_6 = 7.1069 \times 10^{-6},$
$A_8 = 4.9448 \times 10^{-7}, A_{10} = -3.7711 \times 10^{-7}$
Sixth surface $K = -5.0721$
$A_4 = 3.0467 \times 10^{-4}, A_6 = 1.0782 \times 10^{-5},$
$A_8 = 8.2483 \times 10^{-7}, A_{10} = -2.1377 \times 10^{-7}$
Seventh surface $K = -43.9144$
$A_4 = -5.8891 \times 10^{-4}, A_6 = 3.9137 \times 10^{-5},$
$A_8 = -1.6541 \times 10^{-6}$
Eleventh surface $K = 0.7176$
$A_4 = -9.4274 \times 10^{-5}, A_6 = -2.1222 \times 10^{-6},$
$A_8 = 6.1948 \times 10^{-8}, A_{10} = -8.5431 \times 10^{-10}$ In the numerical data shown in the above embodiments, $r_1, r_2, \ldots$ represent radii of curvature of individual lens or prism surfaces; $d_1, d_2, \ldots$ represent thicknesses of individual lenses or prisms, or spaces therebetween; $nd_1, nd_2, \ldots$ represent refractive indices of individual lenses or prisms in the d line; and $v_1, v_2, \ldots$ represent Abbe's numbers of individual lenses or prisms. Also, when Z is taken as the coordinate in the direction of the optical axis, Y is taken as the coordinate in the direction normal to the optical axis, K denotes a conic constant, and $A_4, A_6, A_8,$ and $A_{10}$ denote aspherical coefficients, the configuration of each of the aspherical surfaces in the embodiments is expressed by the following equation:

$$Z = \frac{Y^2/r}{1+\sqrt{1-(1+K)(Y/r)^2}} + A_4 Y^4 + A_6 Y^6 + A_8 Y^8 + A_{10} Y^{10}$$

What is claimed is:
1. A real image mode zoom finder comprising, in order from an object side;
  an objective optical system with positive refracting power including:
    a first lens unit with negative refracting power,
    a second lens unit with positive refracting power,
    a third lens unit with positive refracting power, and
    a fourth lens unit with negative refracting power;
  an image erecting system for erecting an intermediate image formed by said objective optical system; and an ocular optical system with positive refracting power, wherein each of lens units constituting the objective optical system is constructed with a single lens, and an object-side surface of said first lens unit is configured to be concave toward the object, and wherein said objective optical system satisfies the following condition:

$$2.5 < \alpha T(R2) < 5.7$$

where $\alpha T(R2)$ is a combined longitudinal magnification, at a telephoto position of said finder, of an optical section that includes said second lens unit of said objective optical system and all optical elements disposed between said second lens unit and said intermediate image.

2. A real image mode zoom finder according to claim 1, wherein said fourth lens unit of said objective optical system is constructed integrally with a part of said image erecting system.

3. A real image mode zoom finder according to claim 1 or 2, wherein said first lens unit of said objective optical system is fixed when magnification of said real image mode zoom finder is changed.

4. A real image mode zoom finder according to claim 1, wherein an image-side surface of said third lens unit is configured to be aspherical.

* * * * *